(12) United States Patent
Cui

(10) Patent No.: US 6,553,153 B1  
(45) Date of Patent: Apr. 22, 2003

(54) METHOD AND APPARATUS FOR REDUCING VIDEO DATA

(75) Inventor: Ying Cui, Palo Alto, CA (US)

(73) Assignee: Chips and Technologies, LLC., San Jose, CA (US)

(*) Notice: Subject to any disclaimer, the term of this patent is extended or adjusted under 35 U.S.C. 154(b) by 0 days.

(21) Appl. No.: 09/205,643

(22) Filed: Dec. 3, 1998

(51) Int. Cl.[7] .............. G06K 9/32; G06K 9/46; H04N 11/04

(52) U.S. Cl. .............. 382/298; 382/299; 382/295; 382/243; 348/390.1; 348/387.1

(58) Field of Search .............. 382/298, 299, 382/300, 232, 240, 243, 244; 345/127, 130, 439, 555; 358/451, 1.2; 348/385.1, 387.1, 390.1

(56) References Cited

U.S. PATENT DOCUMENTS

| | | | |
|---|---|---|---|
| 4,107,786 A | | 8/1978 | Masaki et al. .............. 364/900 |
| 4,476,464 A | | 10/1984 | Hobbs .............. 340/731 |
| 4,555,191 A | | 11/1985 | Gojo .............. 400/121 |
| 4,586,027 A | | 4/1986 | Tsukiyama et al. .............. 340/347 |
| 4,980,850 A | | 12/1990 | Morgan .............. 364/900 |
| 5,248,964 A | | 9/1993 | Edgard et al. .............. 345/114 |
| 5,265,180 A | * | 11/1993 | Golin .............. 382/236 |
| 5,335,295 A | * | 8/1994 | Ferracini et al. .............. 382/298 |
| 5,402,513 A | * | 3/1995 | Schafer .............. 382/47 |
| 5,574,572 A | * | 11/1996 | Malinowski et al. ....... 358/451 |
| 5,585,856 A | * | 12/1996 | Nakaya et al. .............. 348/441 |
| 5,613,052 A | | 3/1997 | Narayanaswami .......... 395/134 |
| 5,627,765 A | * | 5/1997 | Robotham et al. .......... 364/514 |
| 5,699,277 A | | 12/1997 | Munson et al. .............. 364/514 |
| 5,838,387 A | * | 11/1998 | Allen et al. .................. 348/581 |
| 5,838,838 A | * | 11/1998 | Overton .............. 382/298 |
| 5,850,264 A | * | 12/1998 | Agarwal .............. 348/469 |
| 5,872,864 A | * | 2/1999 | Imade et al. .............. 382/176 |
| 5,874,937 A | | 2/1999 | Kesatoshi .............. 345/127 |
| 5,974,179 A | | 10/1999 | Caklovic .............. 382/232 |
| 6,018,601 A | * | 1/2000 | Cho et al. .............. 382/300 |
| 6,075,906 A | * | 6/2000 | Fenwicki et al. .............. 382/298 |
| 6,094,453 A | * | 7/2000 | Gosselin et al. .............. 375/240 |
| 6,141,061 A | * | 8/2000 | Takeuchi .............. 348/581 |
| 6,151,035 A | * | 11/2000 | Okada .............. 345/509 |

* cited by examiner

*Primary Examiner*—Bhavesh Mehta  
*Assistant Examiner*—Yosef Kassa  
(74) *Attorney, Agent, or Firm*—Thelen Reid & Priest LLP; David B. Ritchie; Marc S. Hanish

(57) ABSTRACT

A method and apparatus for reducing video data. The apparatus is composed of a plurality of reducers. A block is received, corresponding to a plurality of color space components and having a width defined by a plurality of pixels digitally represented by bytes. The video data is first reduced by performing power of two reduction. This is followed by fine scale reduction to achieve the final reduced image.

30 Claims, 10 Drawing Sheets

MPEG 24:2:0 Macroblock Structure

MPEG 24:2:2 Macroblock Structure

MPEG 24:4:4 Macroblock Structure where $P=2^N$, N is a nonnegative integer, and $1 \leq F < 2$

METHOD AND APPARATUS FOR REDUCING VIDEO DATA

BACKGROUND OF THE INVENTION

1. Field of the Invention

The present invention relates to the field of data reduction. More particularly, the present invention relates to methods and apparatus for reducing video data.

2. Background

In multimedia based products for the personal computer, data reduction is a commonly used function when processing and manipulating the digital image. Data reduction is useful during the capture and playback cycle of a full-motion video window with a frame buffer memory subsystem. The frame buffer picture elements (pixels) comprise a rectangular grid of image data that are filtered, stored and displayed using multiple color spaces: red, green and blue (RGB) is often used for graphic data; and the luminance/chrominance (Y, UV) format is often used for full-motion video data. Due to memory bandwidth limitations and differences between source image size and display size, it is desirable to decrease the amount of data processed while maintaining an acceptable image quality.

Current video data reduction techniques have been applied to YUV and RGB data. Such prior art reduction systems typically utilize bilinear interpolation and the dropping of intermediate lines, resulting in relatively poor image quality.

Such prior art reduction systems also typically perform data reduction in one functional module. This is due to real-time constraints, which prevent distributed video data reduction under prior methods. Video data reduction is not done in the background due to limited memory bandwidth. Background processes typically are assigned a low priority for frame memory accesses, creating a bottleneck.

Finally, such reduction systems require interpolation of UV (chrominance) data when converting from the YUV 4:2:0 to YUV 4:2:2 formats. This requires extra hardware and processor utilization. A need exists, to eliminate interpolation in the conversion from the YUV 4:2:0 to the YUV 4:2:2 format.

A compressed digital video stream is made up of a number of still frames, or pictures. Referring first to FIG. 1, a representation of a frame 10 is shown. Each frame 10 comprises a plurality of horizontal slices 12, each of which includes a plurality of macroblocks 14. Macroblock size is typically 16×16 pixels. Such a macroblock is typically further divided into four blocks 15. Block size is 8×8 pixels. A frame, or picture, resolution of 720×576 is defined by 720×576 pixels which correspond to 45×36 macroblocks, or 90×72 blocks.

Many international standards, such as the Moving Picture Expert Group version 2 (MPEG 2), International Standards Organization/International Electrotechnical Commission (ISO/IEC) standard, std. 13818-2:1996, published May 16, 1996, and the MPEG 1 standard, ISO/IEC std. 11172-2:1993, published Aug. 12, 1993, are used for digital video compression and decompression. Each MPEG 2 macroblock comprises a plurality of pixels, each of which is defined by color space components. A color space is a mathematical representation for a color. Different color spaces provide different ways of representing a color which will ultimately be displayed in a video system. For example, the red, green, and blue (RGB) color space is commonly used in computer graphics. Similarly, the YUV color space represents the luminance or "luma" component Y, or black and white portion, as well as the color difference or "chrominance" components U and V. A macroblock in YUV format contains data for all Y, U and V components.

Pixels in each macroblock 14 are traditionally stored in blocks since they are compressed. Three types of macroblocks are available in MPEG 2. Referring to FIG. 2A, the 4:2:0 macroblock consists of four Y blocks 17, one U block 18, and one V block 19. In the 4:2:0 chroma format, for each 16×16 pixel Y block 17, the corresponding U and V blocks have size 8×8 pixels. In other words, for every four Y pixels, one U and one V pixel are shared. Referring to FIG. 3B, the MPEG 2 U and V pixel data is located at half pixel locations in the Y direction. Referring to FIG. 3A, MPEG 1 U and V pixel data is located at half pixel locations in both the X and Y directions. Most MPEG decoders use the 4:2:0 chroma format for internal storage.

Referring to FIG. 2B, a 4:2:2 macroblock consists of four Y blocks 20, two U blocks 21, and two V blocks 22. In the 4:2:2 format, each 16×16 pixel Y block 20 is associated with one U and one V block having size 16×8 pixels. In this format, two Y pixels share one U and one V pixel, as shown in FIG. 3C.

Referring to FIG. 2C, a 4:4:4 macroblock consists of four Y blocks 25, four U blocks 26, and four V blocks 27. Each 16×16 pixel Y block is associated with one U and one V block of size 16×16. Therefore, the 4:4:4 format stores an equal number of Y, U and V pixels, as shown in FIG. 3D.

Typically, video data in block format must be scaled during video processing because the source image size may differ from the display size. When reduction is required, it is desirable to create a reduced image while maintaining as much information from the original image as possible. The simplest form of reduction is pixel dropping, where (m) out of every (n) pixels are thrown away both horizontally and vertically. Data is "dropped" when the reduced image excludes pixel information from the original image. For example, a reduction factor of one third (resulting in an image that is one ninth as large as the original), results in two out of every three pixels being discarded in both the horizontal and vertical directions. Reduction using pixel dropping is not recommended if the resulting image is to be further processed due to the introduction of aliasing components. A "decimation filter" can be used, which bandwidth-limits the image horizontally and vertically before decimation. However, each scaling factor requires different filter coefficients.

An improvement in video quality of scaled images is possible using linear interpolation. Bilinear interpolation combines the linear interpolation process in both the horizontal and vertical directions. When an output sample falls between two input samples (horizontally or vertically), the output sample is computed by linearly interpolating between the two input samples. However, scaling to images smaller than one half of the original may result in dropped data.

Linear interpolation may be performed on the Y, UV data. For example, The Y (luminance) value for the new reduced pixel is calculated using the following equation:

$$I_n = (F_n * P_n) + (F_{n+1} * P_{n+1})(F_n + F_{n+1} = 1)$$

where $F_n$ and $F_{n+1}$ are weight factors for neighboring pixels $P_n$ and $P_{n+1}$ of the new reduced pixel $I_n$. The weight factors are calculated from the distance from $I_n$ to the neighboring pixel. However, those of ordinary skill in the art will recognize that alternative weight factor criteria are possible.

Although linear interpolation was illustrated in one dimension, those of ordinary skill in the art will recognize the reduction method may be applied in two dimensions.

Other approaches include higher order filters. Generally, the higher the order of the interpolation, n, the better the overall response. Nth order filters, where N is greater than one, allow reduction scales up to N+1:1 without dropping data. This is illustrated in Table 1 below.

TABLE 1

| One Step Reduction | Highest Reduction Scale Without Dropping Data |
| --- | --- |
| Drop Pixels | 1:1 |
| Nearest Neighbor | 1:1 |
| Linear Interpolation | 2:1 |
| $2^{nd}$ Order Filter | 3:1 |
| $3^{rd}$ Order Filter | 4:1 |
| Nth Order Filter | N + 1:1 |

Higher order filters require significantly more hardware and memory bandwidth than pixel dropping or linear interpolation. The hardware required to implement such prior art reducers is shown in Table 2 below. The drop pixel and nearest neighbor methods require a minimum amount of hardware, but yield relatively low quality images. Linear interpolation requires additional hardware and yields better images, but data is dropped at reduction scales greater than 2:1. Nth order filters yield significantly better images, but require much more hardware. A need exists for a method and apparatus for creating reduced video images having a reduction scale greater than 2:1, without dropping data, and with a minimal amount of hardware.

TABLE 2

| Reduction Method | Filter Order | Hardware Cost | Reduction Quality |
| --- | --- | --- | --- |
| Drop Pixels | 0 | 0 to 1 line buffers | Low |
| Nearest Neighbor | 0 | 0 to 1 line buffers | Low |
| Linear Interpolation | $1^{st}$ | 1 to 2 line buffers, 2 multipliers | Medium |
| $2^{nd}$ Order Filter | $2^{nd}$ | 2 to 3 line buffers, many multipliers | High |
| $3^{rd}$ Order Filter | $3^{rd}$ | 3 to 4 line buffers, many multipliers | High |
| Sinc Function | Higher | ≧4 line buffers, many multipliers | High |

BRIEF DESCRIPTION OF THE INVENTION

A block within a macroblock within a frame is received from a digital video data stream. The macroblock comprises a plurality of color space components, each color space component having at least one block. Each block comprises a plurality of lines, with each line comprising a plurality of pixels. The macroblock has a width defined by a plurality of pixels. The block is reduced by a power of two and stored to memory.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

This invention presents a new method and apparatus for reducing the three color space components of digital video data. Although the present invention is particularly useful for reducing YUV color space components, it is equally applicable to other color spaces such as RGB, YIQ and Hue Saturation Intensity (HSI).

Figure 1:
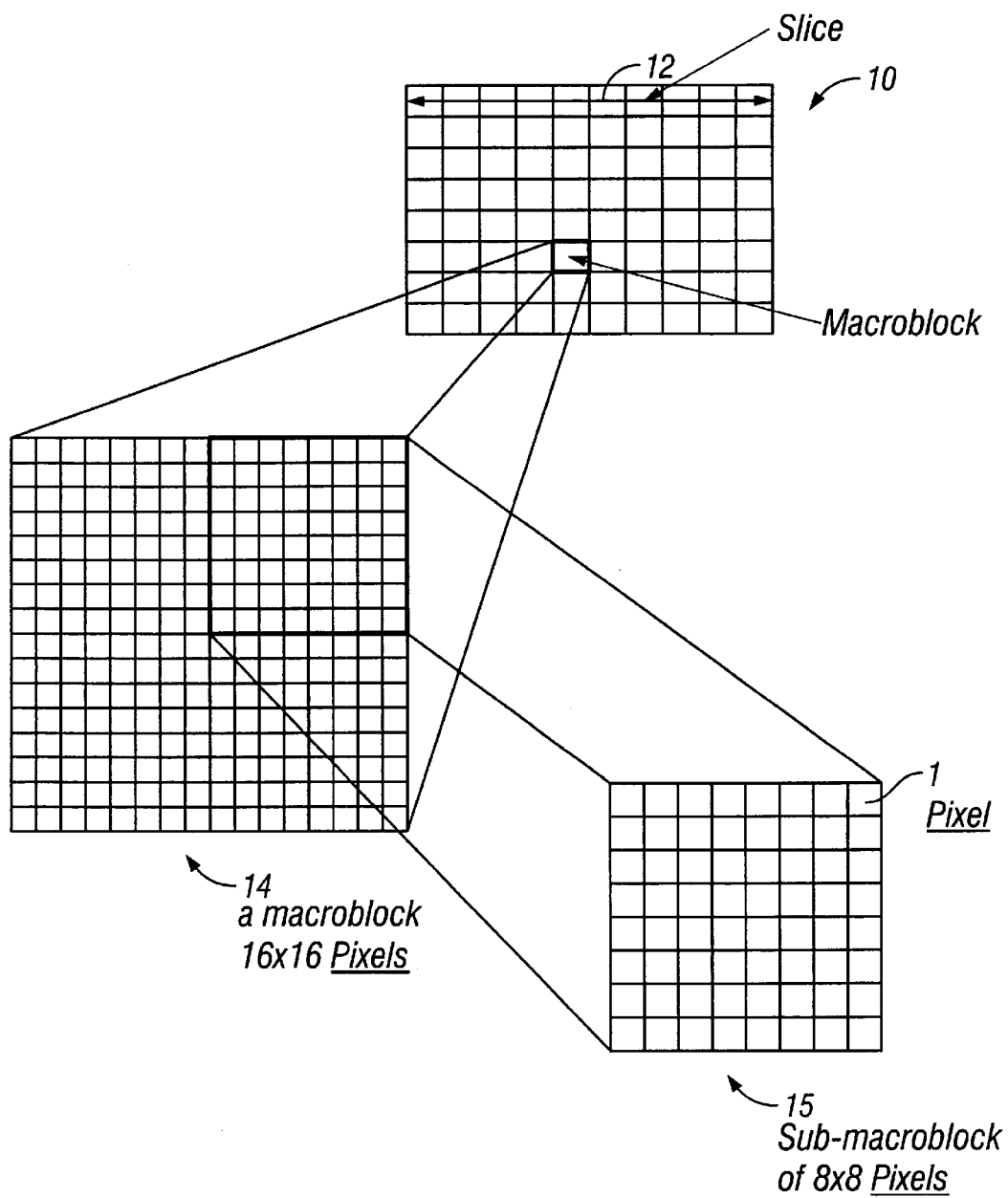
FIG. 1 illustrates the relationship between frames, 16×16 macroblocks, and 8×8 blocks.
Figure 2A:
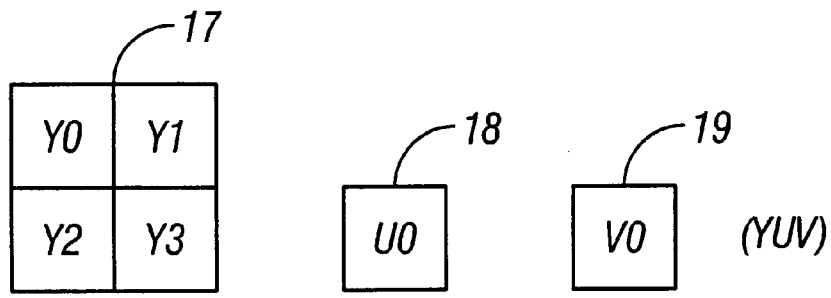
FIG. 2A illustrates YUV 4:2:0 MPEG-2 macroblock structure.
Figure 2B:
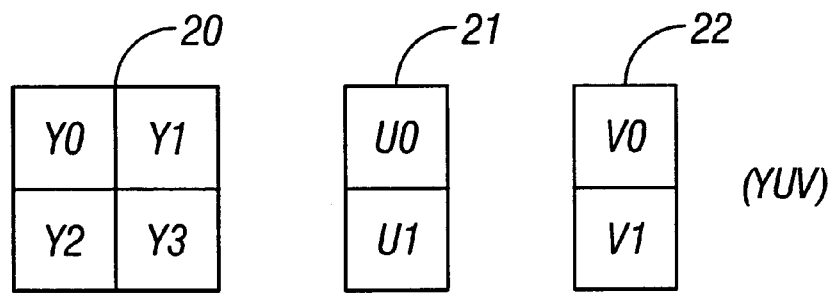
FIG. 2B illustrates YUV 4:2:2 MPEG-2 macroblock structure.
Figure 2C:
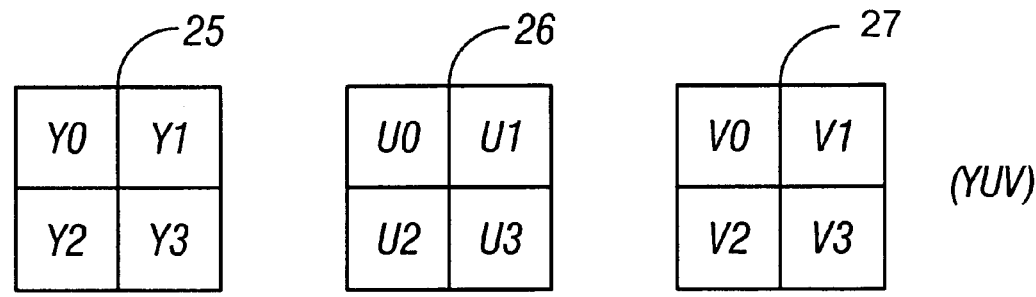
FIG. 2C illustrates YUV 4:2:4 MPEG-2 macroblock structure.
Figure 3A:
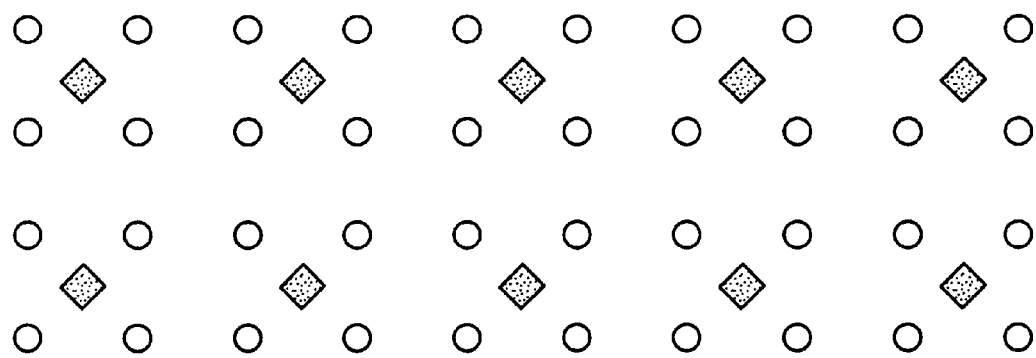
FIG. 3A illustrates YUV 4:2:0 MPEG-1 picture sampling.
Figure 3B:
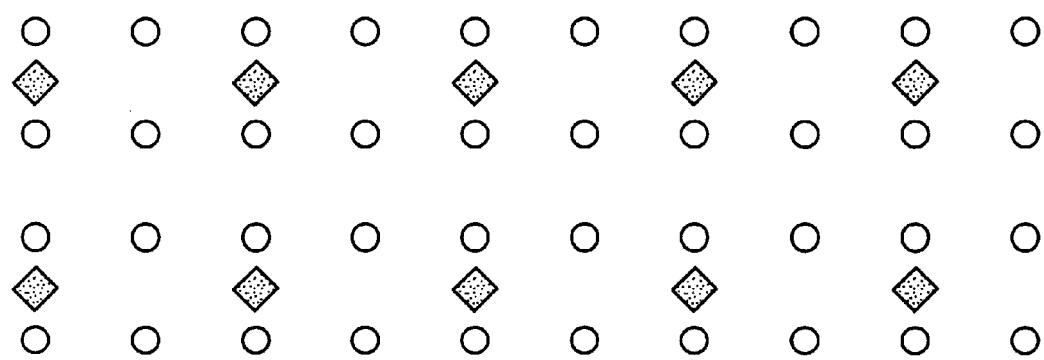
FIG. 3B illustrates YUV 4:2:0 MPEG-2 picture sampling.
Figure 3C:
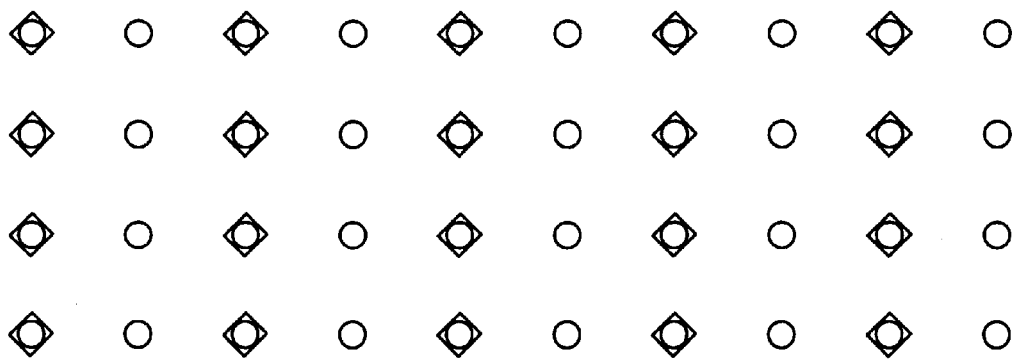
FIG. 3C illustrates a YUV 4:2:2 MPEG-2 picture sampling.
Figure 3D:
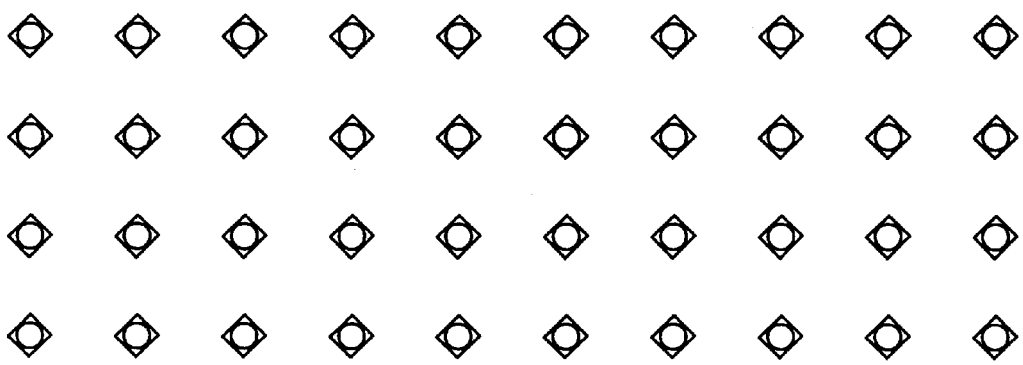
FIG. 3D illustrates YUV 4:4:4 MPEG-2 picture sampling.
Figure 4:
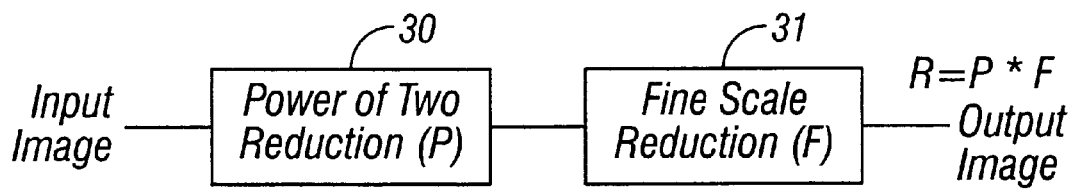
FIG. 4 is a block diagram illustrating two step image reduction.

Video playback in a distributed environment typically includes several data intensive steps. Data is passed among several parts of the system. As such, decreasing the required data bus bandwidth is essential to minimizing data bus traffic. Referring to FIG. 4, through the use of this new method and apparatus for reducing video data, YUV data reduction is partitioned into power of two reduction 30 and fine scale reduction 31, resulting in more efficient use of the data bus. The required reduction scale (R) is partitioned into a power of two factor (P) and a fractional factor (F) according to the following equation:

$$R=P*F$$

The fractional factor (F) has a value between one and two.

In hardware implementations, the amount of hardware and the number of clock cycles required to read and write the video data are minimized. Alternatively, the new method and apparatus may be used in software based video data reducers.

Two step reduction using power of two reduction followed by fine scale reduction provides substantial benefits over traditional methods of video data reduction. Reduction is usually done with bilinear interpolation and dropping intermediate lines, resulting in poor image quality. The image quality decreases as the reduction scale increases, since more pixel data is lost. Power of two reduction does not drop data, resulting in better image quality relative to reduction methods that do not employ power of two reduction.

Traffic through memory is also reduced. Frame memory access time is often a bottleneck for background video processing, since its memory access has low priority. Consequently, traditional methods perform video data reduction as part of its foreground processing only. The present invention enables reduction in a background processor, since image data reduction is partitioned into power of two reduction and fine scale reduction, reducing traffic through memory and the amount of data passed between processing units.

Unnecessary processing is also eliminated. Video data is often stored in 4:2:0 format during video processing. Prior to display, the data must be upsampled to 4:4:4 format. If the 4:2:0 data is created using the traditional methods of bilinear interpolation or dropping intermediate lines, the upsampling process requires interpolation of the UV data. The current invention eliminates this interpolation in reduction modes where power of two reduction is applied, since UV data is at half pixel locations.

Figure 5:
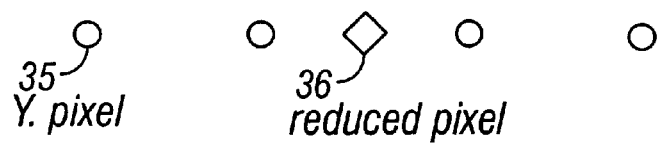
FIG. 5. illustrates a one dimensional 4:1 and 8:1 reduction using power of two reduction.
Figure 5:
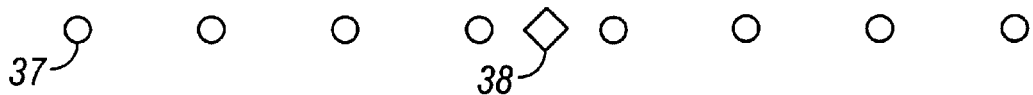

Referring now to FIG. 5, a diagram showing one dimensional power of two reduction is presented. This particular example illustrates 4:1 reduction. Four Y (luminance) pixels are shown. The reduced pixel 36 is shown in the center. The Y (luminance) 35 value for the reduced pixel 36 is calculated using the following equation:

$$I_n = (P_{n-1} + P_n + P_{n+1} P_{n+2})/4$$

where $P_{n+1}$, $P_n$, $P_{n+1}$ and $P_{n+2}$ are the Y (luminance) 35 values for the nearest four neighboring pixels of the new reduced pixel $I_n$ 36. The same reduction method may be used on the U and V components.

Referring still to FIG. 5, one dimensional 8:1 reduction using power of two reduction is illustrated. The Y (luminance) 37 value for the reduced pixel 38 is calculated using the following equation:

$$I_n = (P_{n-3} + P_{n-2} + P_{n-1} + P_n + P_{n+1} + P_{n+2} + P_{n+3} + P_{n+4})/8$$

where $P_{n-3}$, $P_{n-2}$, $P_{n-1}$, $P_n$, $P_{n+1}$, $P_{n+2}$, $P_{n+3}$ and $P_{n+4}$ are the Y (luminance) 37 values for the nearest eight neighboring pixels of the new reduced pixel $I_n$ 38.

Figure 6:
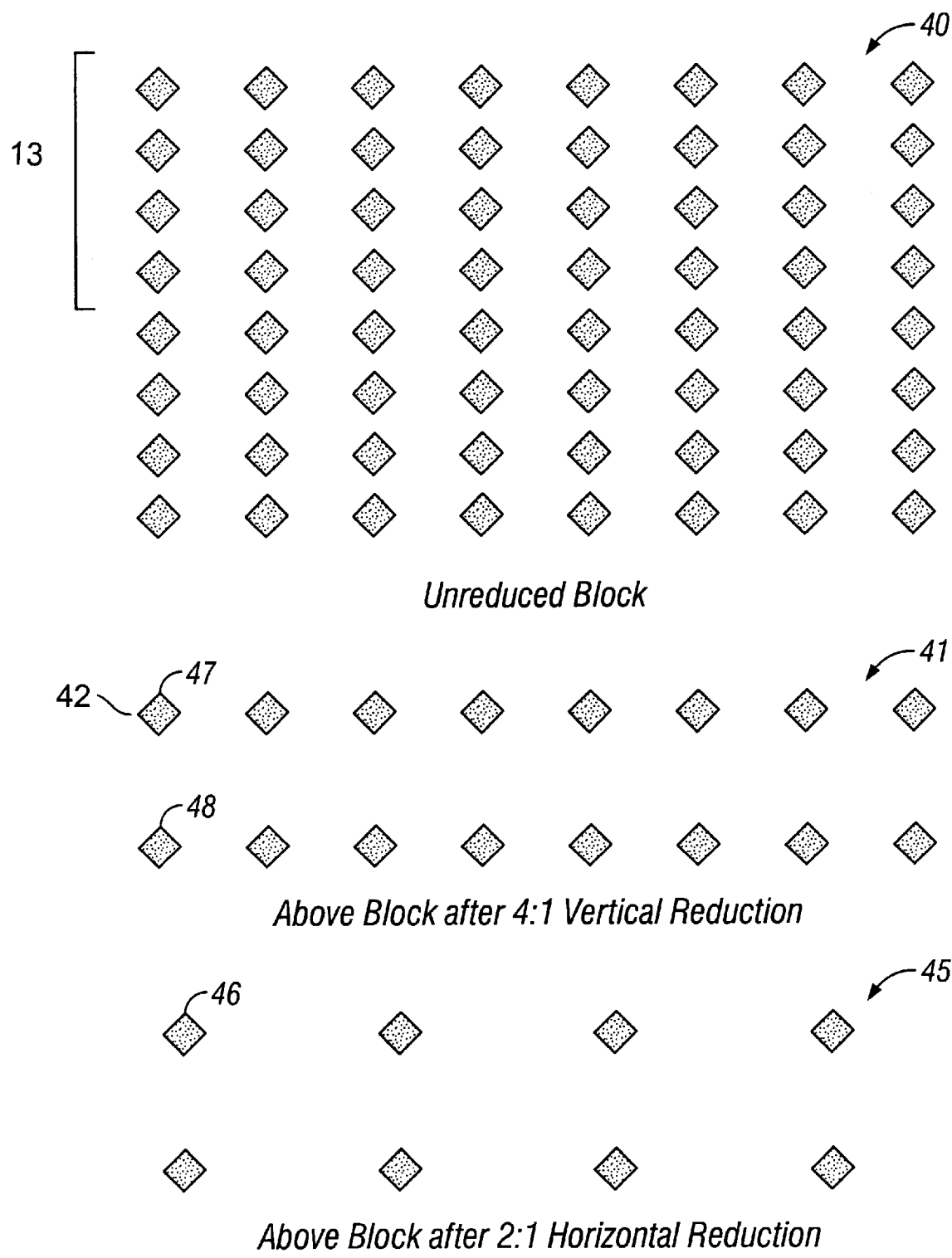
FIG. 6 illustrates two dimensional power of two reduction on an 8×8 block of pixels.

Referring now to FIG. 6, two dimensional power of two reduction of an 8×8 block is illustrated. The unreduced block 40 consists of eight lines of eight pixels. A 4:1 vertical reduction reduces the data in the vertical direction by a factor of four, as shown in the first reduced image 41. Thus, there is one output line for every four input lines. The top line 42 of the first reduced image 41 contains the eight averaged pixel values for the eight columns contained within the top four lines 43 in the unreduced block 40.

A 2:1 horizontal reduction applied to the first reduced image 41 creates a second reduced image 45. The 2:1 horizontal reduction reduces the image data in the horizontal direction by a factor of two. Thus, there is one output column for every two input columns. Pixel 46 contains the averaged value for pixels 47 and 48.

Figure 7:
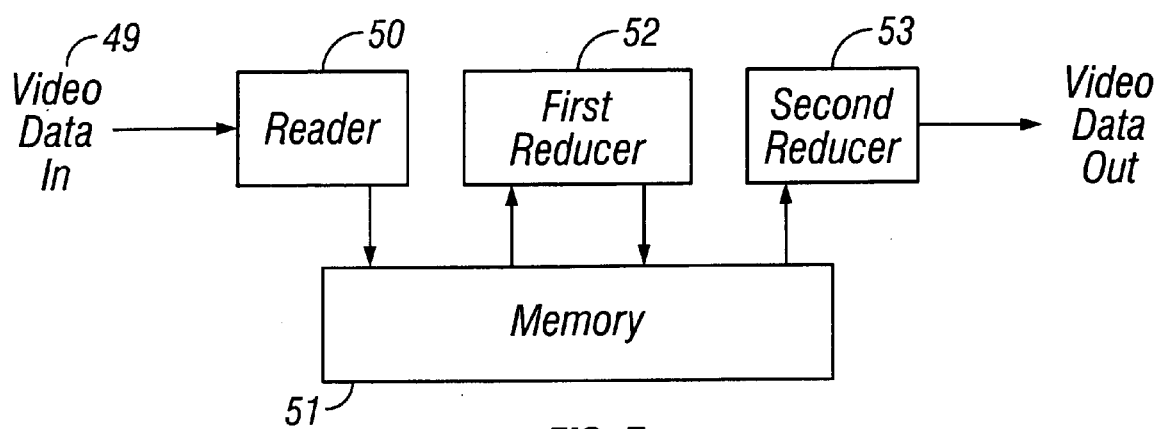
FIG. 7 is a block diagram illustrating an embodiment of the present invention.

Referring now to FIG. 7, a block diagram illustrates a system in which the present invention may be implemented. According to an embodiment of the present invention, a block of video data 49 is received by a reader 50. The reader 50 stores the video data 49 to a memory 51. A first reducer 52 then reads the video data from the memory 51 one line at a time. The first reducer 52 reduces the data by a power of two. The vertical reduction scale and the horizontal reduction scale are separately configurable. The present invention stores the data reduced by a power of two to memory 51. A second reducer 53 reads the reduced data from memory 51, performs fine scale reduction, and transmits the results.

Figure 8:
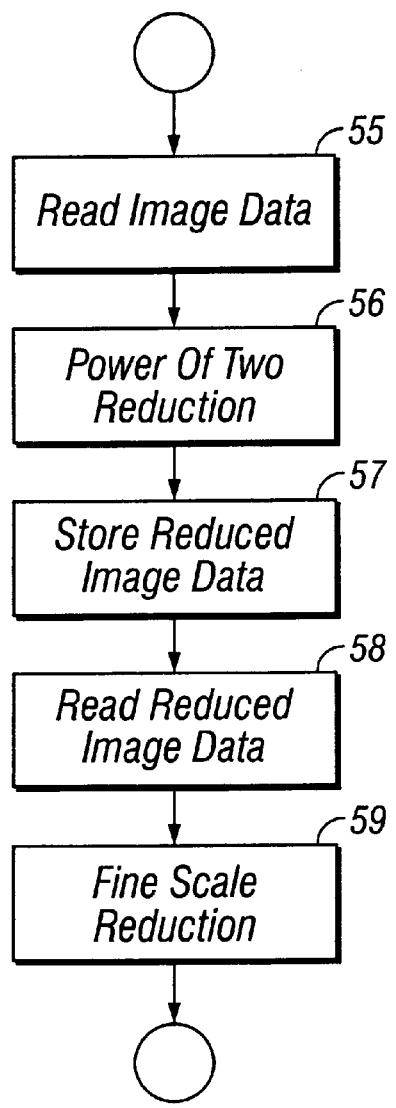
FIG. 8 is a flow diagram illustrating a presently preferred method for reducing video data in accordance with the present invention.

Referring now to FIG. 8, a method for the present invention is illustrated. At reference numeral 55, video data is read by the reader 50. The video data 49 may be in YUV 4:4:4 or YUV 4:2:2 format. However, those of ordinary skill in the art will readily recognize that other formats may be used as well. The reader 50 stores the video data 49 in memory 51 in YUV 4:2:0 or 4:2:2 format. However, those of ordinary skill in the art will recognize that alternative formats may be used as well.

At reference numeral 56, the first reducer 52 reads the video data 49 from memory 51. The type of vertical reduction and the type of horizontal reduction performed are separately configurable. If the required reduction scale is at least 2:1, the first reducer 52 reduces the data by a factor of two. At reference numeral 57, After the data is reduced, it is stored to memory 51.

At reference numeral 58, the second reducer 53 receives the reduced image data from memory 51. At reference numeral 59, if fractional reduction is required, the second reducer 53 further reduces the image using fine scale reduction. According to one embodiment of the present invention, fine scale reduction is performed using bilinear interpolation. However, those of ordinary skill in the art will recognize that alternative fine scale reduction methods are possible. After the reduction, the second reducer 53 transmits the results.

Figure 9:
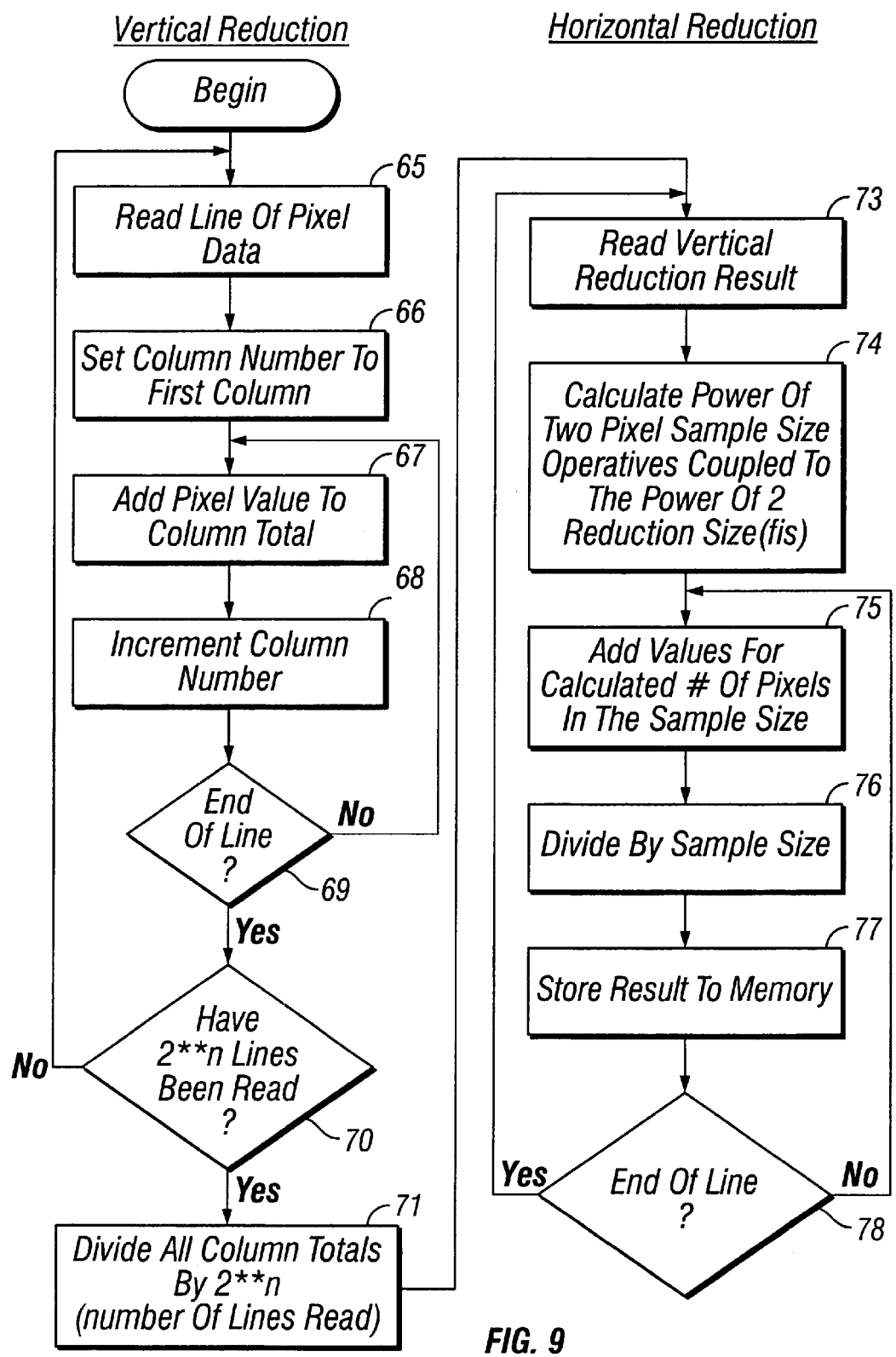
FIG. 9 is a flow diagram illustrating a presently preferred method for power of two reduction.

Referring now to FIG. 9, a method for performing power of two reduction on video data is presented. Power of two vertical reduction begins at reference numeral 65, where a line of pixel data is read. According to one embodiment of the present invention, each line is from an 8×8 block of pixel data. At reference numeral 66, the column number is initialized to the first column in the line. At reference numeral 67, the value of the pixel is added to the total for the current column. At reference numeral 68, the column number is incremented. At reference numeral 69, a check is made to determine whether the end of the line has been reached. If the end of the line has not been reached, the operation continues with reference numeral 67. Otherwise, a check is made at reference numeral 70 to determine whether the required number of lines have been read. The required number of lines is operatively coupled to the vertical reduction scale. For example, a vertical reduction scale of 4:1 requires four lines for every reduced line. If the required number of lines have not been read, operation continues at reference numeral 65. Otherwise, at reference numeral 71, all the column totals are divided by the number of lines read.

Power of two horizontal reduction begins at reference numeral 73. At reference numeral 73, the vertical reduction results from reference numeral 71 are received. At reference numeral 74, the power of two sample size is determined. The sample size is operatively coupled to the power of two reduction scale. For example, a horizontal reduction scale of 8:1 requires a sample size of eight. At reference numeral 75, the values for the number of pixels in the sample size are accumulated. At reference numeral 76, the accumulated total is divided by the sample size. At reference numeral 77, the result is stored to memory. At reference numeral 78, a check is made to determine whether the end of a line has been reached. If so, operation continues at reference numeral 73, where another line is read. Otherwise, operation continues at reference numeral 75.

Power of two reduction is performed if the required reduction scale is at least 2:1. If the required reduction scale is at least n:1, where n is a power of two, the video data 49 is reduced by a factor of n. For example, if the required reduction scale is 2:1, the video data 49 is reduced by a factor of two. If the reduction scale is 3:1, the first reducer 52 reduces the video data 49 by a factor of 2, and the second reducer 53 reduces the data previously reduced by the first reducer 52 by 1.5:1. If the reduction scale is 4:1, the first reducer 52 reduces the video data 49 by a factor of four, and the second reducer 53 performs no reduction. If the required reduction scale is less than two, the first reducer 52 performs no reduction, and the second reducer 53 performs the entire reduction.

According to one embodiment of the present invention, the second reducer 53 performs fine scale reduction using bilinear interpolation.

According to another embodiment of the present invention, fine scale reduction may include higher order filters over larger regions. The higher the order of the filter, the better the overall response.

According to another embodiment of the present invention, fine scale reduction may include a "sinc" function. The sinc function is defined as $sin(x)=sin(\pi x)/\pi x$. It is the form of a Fourier transform of a rectangular pulse. Bilinear interpolation is a first-order approximation to the sinc function. The use of the sinc function is well known in the art and will therefore not be discussed herein to avoid obscuring the present invention.

Figure 10A:
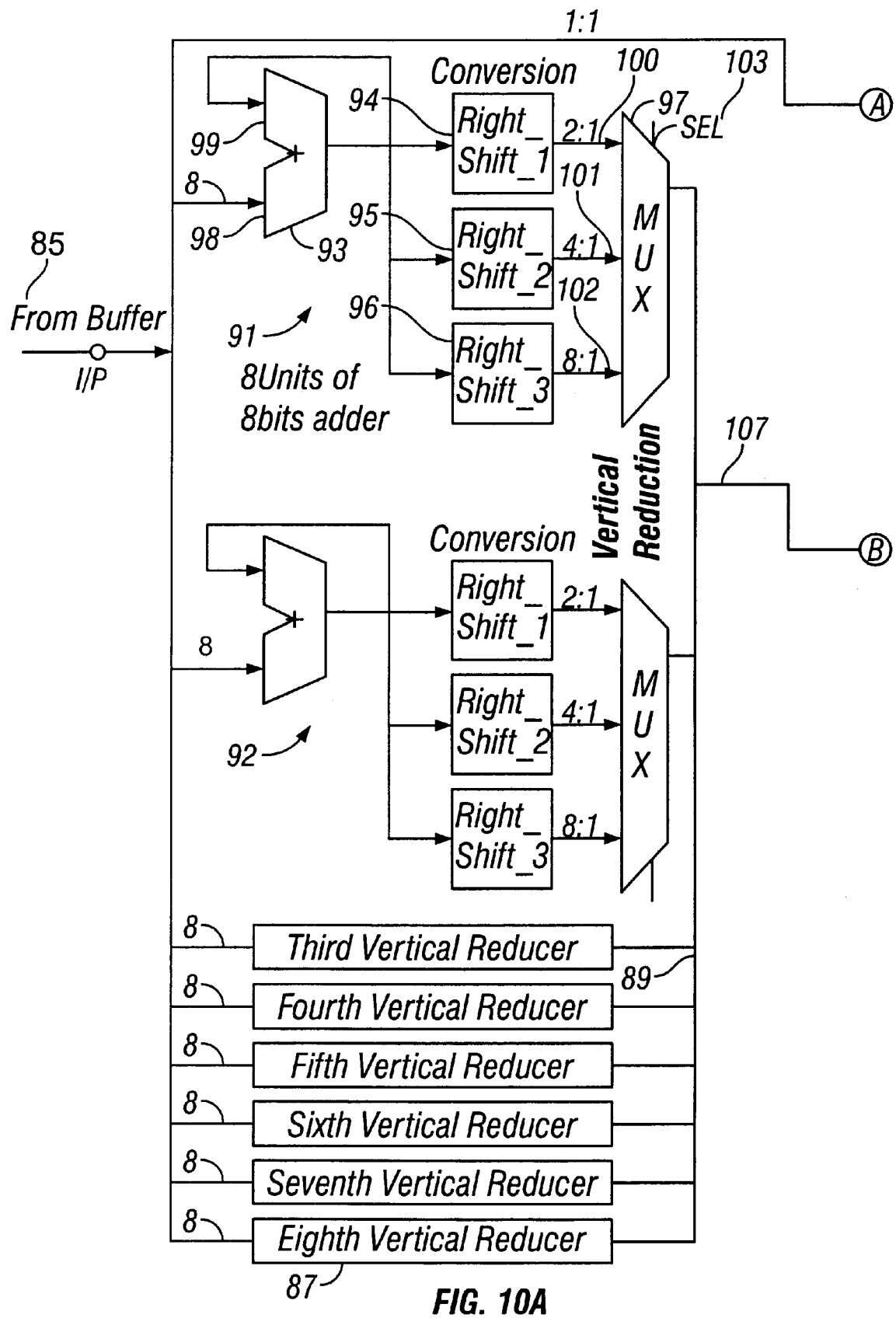
FIG. 10 is a block diagram illustrating an embodiment in accordance with the first reducer of the present invention.
Figure 10B:
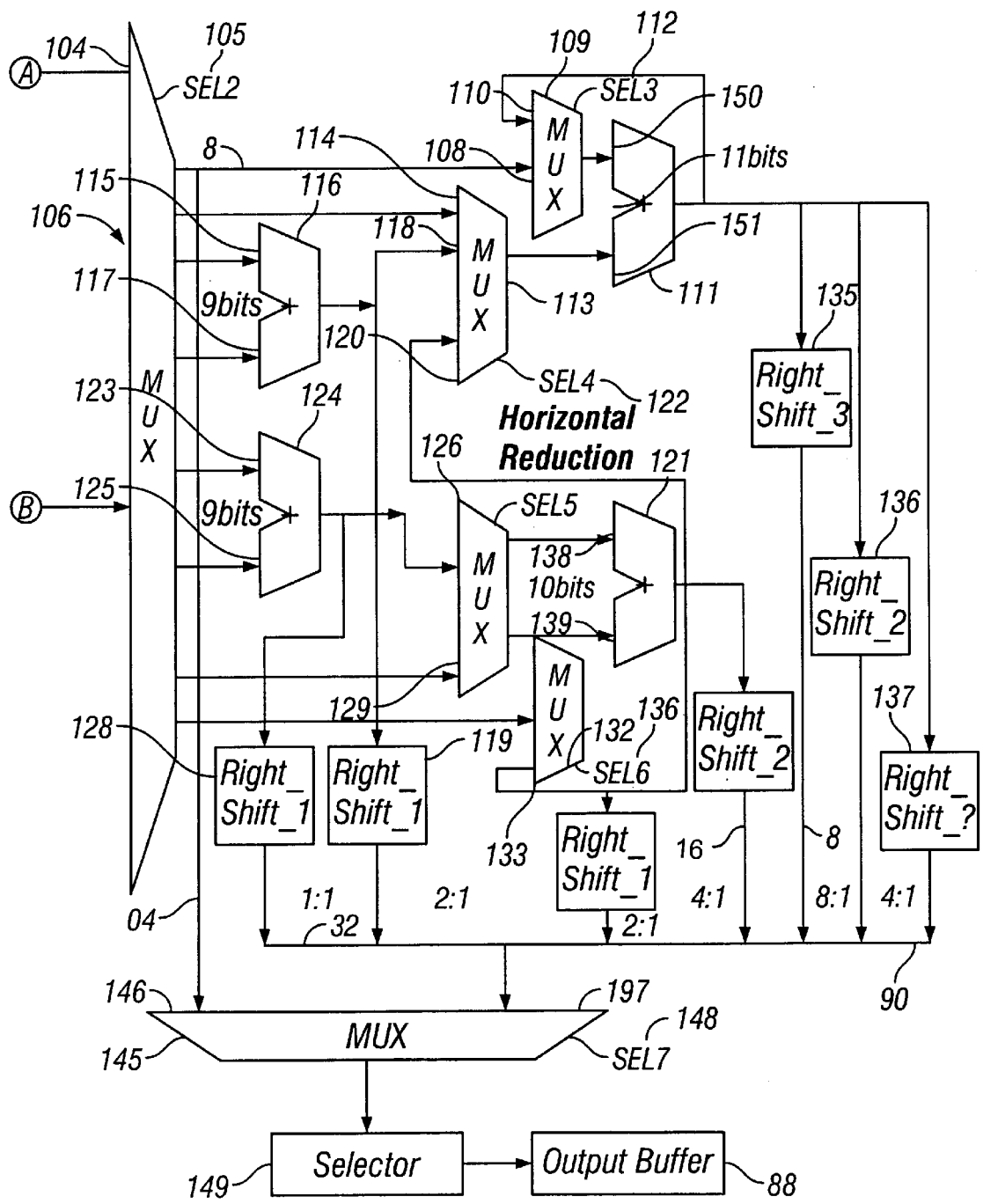

Referring to FIG. 10, an embodiment of the first reducer 52 component is presented. Eight eight-bit pixels from a horizontal line of an 8×8 block appear in the input buffer 85. There is one vertical reduction unit 84 comprising eight vertical reduction subunits 87, and one horizontal reduction unit 86. Each vertical reduction subunit 87 reduces zero, two, four or eight lines of pixel data, depending upon the reduction scale. The reduced lines are passed to the horizontal reduction unit 86 one reduced line at a time. The horizontal reduction unit 86 reduces a horizontal line of pixel data. The results of the reduction are written to an output buffer 88. First data bus 89 and second data bus 90 are 64-bit buses for the illustrative embodiment of the invention disclosed herein, providing reduction scales of 2:1, 4:1 or 8:1. Those of ordinary skill in the art will appreciate from the disclosure how other multiple pixel formats may be reduced by any factor of two according to the present invention.

Power of Two Vertical Reduction

The vertical reduction unit 84 comprises eight vertical reduction subunits 87. Each vertical reduction subunit 87 performs vertical reduction on a column of pixels extracted from a plurality of input lines 85. A first vertical reduction subunit 91 and a second vertical reduction subunit 92 are illustrated in detail. Each vertical reduction subunit 87 uses one adder and three dividers, each of which operate at one clock cycle. Those of ordinary skill in the art will readily recognize that an adder or divider may be implemented with various circuitry. The vertical reduction unit also uses eight multiplexers. However, those of ordinary skill in the art will recognize that a multiplexer may be implemented other ways, including the use of a lookup table.

The first vertical reduction subunit 91 comprises a first eleven-bit adder 93, a first divide by two component 94, a first divide by four component 95, a first divide by eight component 96, and a first multiplexer 97. The first vertical reduction subunit 91 is used is to average the first pixel of two, four or eight lines, depending on the reduction scale. The second vertical reduction subunit 92 is used to average the second pixel of two, four or eight lines, depending on the reduction scale. The relationship between the reduction scale, the number of pixels reduced, and the number of lines in the resultant image is shown in Table 3 below relating to power of two vertical reduction for an eight-line block.

TABLE 3

| Reduction Scale | Number of Input Pixels Averaged per Reduced Pixel | Number of Lines in Reduced Image |
|---|---|---|
| 1:1 | 1 | 8 |
| 2:1 | 2 | 4 |
| 4:1 | 4 | 2 |
| 8:1 | 8 | 1 |

The first eight bit positions of a 64-bit input buffer 85 are presented to the second data input 98 of the first eleven-bit adder 93. The output of the first eleven-bit adder 93 is initialized to zero. The nine-bit sum output of the first eleven-bit adder 93 is presented to a second data input 99 of the first eleven-bit adder 93, a first divide by two component 94, a first divide by four component 95, and a first divide by eight component 96.

The output of the first divide by two component 94 is presented to the first data input 100 of a first multiplexer 97. The output of the first divide by four component 95 is presented to the second data input 101 of the first multiplexer 97. The output of the first divide by eight component 96 is presented to the third data input 102 of the first multiplexer 97. The first multiplexer 97 has a select line (SEL1) 103 operatively coupled to the vertical reduction scale. When the vertical reduction scale is 1:1, SEL1 103 is 00, selecting no input, and the data is delivered via 106. When the reduction scale is 2:1, SEL1 103 is 01, selecting the first data input 100. When the reduction scale is 4:1, SEL1 103 is 10, selecting the second data input 101. When the reduction scale is 8:1, SEL1 103 is 11, selecting the third data input 102. According to one embodiment of the present invention, the select lines for the multiplexers in each vertical reducer 87 are identical, and may be operatively coupled to each other. Those of ordinary skill in the art, therefore, will readily recognize that the inputs to each multiplexer may be interchanged while preserving the reduction operations.

The relationship between the vertical and horizontal reduction scale and number of pixels is shown in Table 4 below. In the table, the term "Input" refers to the data input to the horizontal reduction unit 86, which is the data output by the vertical reduction unit 84. The term "Output" refers to the data output by the horizontal reduction unit 86.

TABLE 4

| Vertical Reduction Scale | Horizontal Reduction Scale | Number of Input Lines | Number of Input Pixels per Line | Number of Output Lines | Number of Output Pixels per Line |
|---|---|---|---|---|---|
| 1:1 | 1:1 | 8 | 8 | 8 | 8 |
| 1:1 | 2:1 | 8 | 8 | 8 | 4 |
| 1:1 | 4:1 | 8 | 8 | 8 | 2 |
| 1:1 | 8:1 | 8 | 8 | 8 | 1 |
| 2:1 | 1:1 | 4 | 8 | 4 | 8 |
| 2:1 | 2:1 | 4 | 8 | 4 | 4 |
| 2:1 | 4:1 | 4 | 8 | 4 | 2 |
| 2:1 | 8:1 | 4 | 8 | 4 | 1 |
| 4:1 | 1:1 | 2 | 8 | 2 | 8 |
| 4:1 | 2:1 | 2 | 8 | 2 | 4 |
| 4:1 | 4:1 | 2 | 8 | 2 | 2 |
| 4:1 | 8:1 | 2 | 8 | 2 | 1 |
| 8:1 | 1:1 | 1 | 8 | 1 | 8 |

TABLE 4-continued

| Vertical Reduction Scale | Horizontal Reduction Scale | Number of Input Lines | Number of Input Pixels per Line | Number of Output Lines | Number of Output Pixels per Line |
|---|---|---|---|---|---|
| 8:1 | 2:1 | 1 | 8 | 1 | 4 |
| 8:1 | 4:1 | 1 | 8 | 1 | 2 |
| 8:1 | 8:1 | 1 | 8 | 1 | 1 |

According to one aspect of the present invention, vertical reduction is not performed. The second multiplexer 104 is presented with all 64 bits from the input buffer 85. The second mulitplexer 104 selects the unreduced data 106 and performs horizontal reduction on the data.

In accordance with another preferred embodiment of the present invention, input data is reduced by a factor of two. This corresponds to a reduction scale of 2:1. The operation of the first vertical reduction subunit 91 is described below. During the first clock cycle, the first eight bits of the input buffer 85 are presented to the second data input 99 of the first eleven-bit adder 93.

During the next clock cycle, a second line is received in the input buffer 85. The output of the first eleven-bit adder 93 is presented to the first data input 99 of the first eleven-bit adder 93. The first eight bits of the input buffer 85 are presented to the second data input 98 of the first eleven-bit adder 93.

During the next clock cycle, the output of the first eleven-bit adder 93 is presented to the first divide by two component 94. The first divide by two component 94 divides the data by two.

During the next clock cycle, the first multiplexer 97 selects the output of the first divide by two component 94. The data is written to bits 0–7 of a first data bus 89.

In accordance with another preferred embodiment of the present invention, the input data is reduced by a factor of four. This corresponds to a reduction scale of 4:1. During the first clock cycle, the first eight bits of the input buffer 85 are presented to the second data input 98 of the first eleven-bit adder 93.

During the next clock cycle, a second line is received in the input buffer 85. The output of the first eleven-bit adder 93 is presented to the first data input 99 of the first eleven-bit adder 93. The first eight bits of the input buffer 85 are presented to the second data input 98 of the first eleven-bit adder 93.

During the next clock cycle, a third line is received in the input buffer 85. The output of the first eleven-bit adder 93 is presented to the first data input 99 of the first eleven-bit adder 93. The first eight bits of the input buffer 85 are presented to the second data input 98 of the first eleven-bit adder 93.

During the next clock cycle, a fourth line is received in the input buffer 85. The output of the first eleven-bit adder 93 is presented to the first data input 99 of the first eleven-bit adder 93. The first eight bits of the input buffer 85 are presented to the second data input 98 of the first eleven-bit adder 93.

During the next clock cycle, the output of the first eleven-bit adder 93 is presented to the first divide by four component 95. The first divide by four component 95 divides the data by four.

During the next clock cycle, the first multiplexer 97 selects the output of the first divide by four component 95. The data is written to bits 0–7 of the first data bus 89.

In accordance with another preferred embodiment of the present invention, the input data is reduced by a factor of eight. This corresponds to a reduction scale of 8:1. During the first clock cycle, the first eight bits of the input buffer 85 are presented to the second data input 98 of the first eleven-bit adder 93. Eight clock cycles are required to add the pixel values for the first pixel in eight lines. During the ninth clock cycle, the output of the first eleven-bit adder 93 is presented to the first divide by eight component 96. The first divide by eight component 96 divides the data by eight.

During the next clock cycle, the first multiplexer 97 selects the output of the first divide by eight component 96. The data is written to bits 0–7 of the first data bus 89.

Power of Two Horizontal Reduction

According to one embodiment of the present invention, the horizontal reduction unit 86 receives data from the vertical reduction unit 84 one line at a time. The horizontal reduction unit 86 uses four adders and seven dividers, each of which operate at one clock cycle. However, those of ordinary skill in the art will recognize that an adder and a divider may be implemented with various circuitry. The horizontal reduction unit 86 also uses five multiplexers. However, those of ordinary skill in the art will recognize that a multiplexer may be implemented other ways, including the use of a lookup table.

A second multiplexer 104 has a select line (SEL2) 105 operatively coupled to the horizontal reduction scale, a first data input 106 connected to the input buffer 85 and a second data input 107 connected to the first data bus 89. When the reduction scale is 1:1, SEL2 105 is 0, selecting data from the input buffer 85. When the reduction scale is 2:1, 4:1 or 8:1, SEL2 105 is 1, selecting reduced data 107 from the first data bus 89.

The first eight bits of the second multiplexer 104 output are presented to a second data input 108 of a third multiplexer 109. The third multiplexer 109 has a first data input 110 connected to the output of a second eleven-bit adder 111 and a select line (SEL3) 112. The select line is operatively coupled to the reduction scale.

The second eight bits of the second multiplexer output are presented to the first data input 114 of the fourth multiplexer 113.

The third eight bits of the second multiplexer 104 output are presented to a first data input 115 of the first nine-bit adder 116. The fourth eight bits of the second multiplexer 104 output are presented to a second data input 117 of the first nine-bit adder 116. The output of the first nine-bit adder 116 is initialized to zero. The nine-bit sum output of the first nine-bit adder 116 is presented to the second data input 118 of the fourth multiplexer 113 and a second divide by two component 119. The second divide by two component 119 divides the data by two. The fourth multiplexer 113 has a third data input 120 connected to the output of a ten-bit adder 121, and a select input (SEL4) 122. The select line is operatively coupled to the reduction scale.

The fifth eight bits of the second multiplexer 104 output are presented to a first data input 123 of the second nine-bit adder 124. The sixth eight bits of the second multiplexer 104 output are presented to a second data input 125 of the second nine-bit adder 124. The output of the second nine-bit adder 124 is initialized to zero. The nine-bit sum output of the second nine-bit adder 124 is presented to the first data input 126 of a fifth multiplexer 127, and a third divide by two component. The third divide by two component divides the data by two.

The seventh eight bits of second multiplexer 104 output are presented to the second data input 129 of the fifth multiplexer 127. The fifth multiplexer 127 has a first data input 126 connected to the output of the second nine-bit adder 124, and a select input (SEL5) 130. The select line is operatively coupled to the reduction scale.

The eighth eight bits of second multiplexer 104 output are presented to the first data input 131 of a sixth multiplexer 132. The sixth multiplexer 132 has a second data input 133 connected to the output of the ten-bit adder 121, and a select input (SEL6) 134. The select line is operatively coupled to the reduction scale.

The output of the third multiplexer 113 is presented to the first data input 150 of the second eleven-bit adder 111. The output of the fourth multiplexer 113 is presented to the second data input 151 of the second eleven-bit adder 111. The output of the second eleven-bit adder 111 is initialized to zero. The eleven-bit, sum output of the second eleven-bit adder 111 is presented to a second divide by eight component 135, a third divide by four component 136 and a fifth divide by two component 137. The second divide by eight component 135 divides the data by eight. The third divide by four component 136 divides the data by four. The fifth divide by two component divides the data by two 137.

The output of the fifth multiplexer 127 is presented to the first data input 138 of the ten-bit adder 121. The output of the sixth multiplexer 132 is presented to the second data input 139 of the ten-bit adder 121. The output of the ten-bit adder 121 is initialized to zero. The ten-bit sum output of the ten-bit adder 121 is presented to a second divide by four component 140 and a fourth divide by two component 141. The second divide by four component 140 divides the data by four. The fourth divide by two component 141 divides the data by two.

A second data bus 90 is coupled to the output of second divide by two component 128, third divide by two component 119, fourth divide by two component 141, second divide by four component 140, third divide by four component 136, second divide by eight component 135, and a seventh multiplexer 145. The seventh multiplexer 145 has a first data input 146 connected to the output of the second multiplexer 104, a second data input 147 connected to the second data bus 90, and a select input (SEL7) 148. The select line is operatively coupled to the reduction scale.

The output of the seventh multiplexer 145 is connected to a selector 149, which selects data from the output of the seventh multiplexer 145. The selector 149 is operatively coupled to the reduction scale,. If the reduction scale is 1:1, all 64 bits are selected. If the reduction scale is 2:1, bits 32–63 are selected. If the reduction scale is 4:1, bits 48–63 are selected. If the reduction scale is 8:1, bits 56–63 are selected. The output of the selector 149 is presented to an output buffer 88.

In accordance with one aspect of the preferred embodiment of the present invention, the data from the vertical reduction unit 84 is not reduced. This corresponds to a scale of 1:1. All 64 bits from the second multiplexer 104 are presented to the seventh multiplexer 145. The selector 149 passes all 64 bits to the output buffer 88.

In accordance with another preferred embodiment of the present invention, the data from the vertical reduction unit 84 is reduced by a factor of eight. This corresponds to a reduction scale of 8:1. During the first clock cycle, the first eight bits and the second eight bits of the second multiplexer 104 output are presented to the second eleven-bit adder 111. The third and fourth eight bits are presented to the first nine-bit adder 116. The fifth and sixth eight bits are presented to the second nine-bit adder 124. The seventh and eighth eight bits are presented to the ten-bit adder 121.

During the next clock cycle, the output of the second eleven-bit adder 111 is presented to the first data input 150 of the eleven-bit adder. The output of the first nine-bit adder 116 is presented to the second data input 151 of the second eleven-bit adder 111. The output of the second nine-bit adder 124 is presented to the first data input 138 of the ten-bit adder 121. The output of the ten-bit adder 121 is presented to the second data input 139 of the ten-bit adder 121.

During the next clock cycle, the output of the second eleven-bit adder 111 is presented to the first data input 150 of the second eleven-bit adder 111. The output of the ten-bit adder 121 is presented to the second data input 151 of the second eleven-bit adder 111.

During the next clock cycle, the output of the second eleven-bit adder 111 is presented to the second divide by eight component. Next, the seventh multiplexer 145 selects the reduced data 147, and the selector 149 selects bits 56–63.

In accordance with another preferred embodiment of the present invention, the data from the vertical reduction unit 84 is reduced by a factor of four. This corresponds to a reduction scale of 4:1. During the first clock cycle, the first eight bits and the second eight bits of the second multiplexer 104 output are presented to the second eleven-bit adder 111. The third and fourth eight bits are presented to the first nine-bit adder 116. The fifth and sixth eight bits are presented to the second nine-bit adder 124. The seventh and eighth eight bits are presented to the ten-bit adder 121.

During the next clock cycle, the output of the second eleven-bit adder 111 is presented to the first data input 150 of the eleven-bit adder. The output of the first nine-bit adder 116 is presented to the second data input 151 of the second eleven-bit adder 111. The output of the second nine-bit adder 124 is presented to the first data input 138 of the ten-bit adder 121. The output of the ten-bit adder 121 is presented to the second data input 139 of the ten-bit adder 121.

During the next clock cycle, the output of the second eleven-bit adder 111 is presented to the third divide by four component 136. The output of the ten-bit adder 121 is presented to the second divide by four component 140.

During the next clock cycle, the output of the third divide by four component 136 is presented to bits 48–55 of the second data bus 90. The output of the second divide by four component 140 is presented to bits 56–63 of the second data bus 90. Next, the seventh multiplexer 145 selects the reduced data 147, and the selector 149 selects bits 48–63.

In accordance with another preferred embodiment of the present invention, the data from the vertical reduction unit 84 is reduced by a factor of two. This corresponds to a reduction scale of 2:1. During the first clock cycle, the first eight bits and the second eight bits of the second multiplexer 104 output are presented to the second eleven-bit adder 111. The third and fourth eight bits are presented to the first nine-bit adder 116. The fifth and sixth eight bits are presented to the second nine-bit adder 124. The seventh and eighth eight bits are presented to the ten-bit adder 121.

During the next clock cycle, the output of the second eleven-bit adder 111 is presented to the fifth divide by two component 137. The output of the first nine-bit adder 116 is presented to the third divide by two component 119. The output of the second nine-bit adder 124 is presented to the second divide by two component 128. The output of the ten-bit adder 121 is presented to the fourth divide by four component 141.

During the next clock cycle, the output of the fifth divide by two component 137 is presented to bits 56–63 of the second data bus 90. The output of the third divide by two component 119 is presented to bits 48–55 of the second data bus 90. The output of the second divide by two component 128 is presented to bits 40–47 of the second data bus 90. The output of the fourth divide by two component 141 is presented to bits 32–39 of the second data bus 90. Next, the seventh multiplexer 145 selects the reduced data 147, and the selector 149 selects bits 32–63.

Although this invention is used with the MPEG 1 and MPEG 2 compression standards, this invention can also be used with other compression standards, such as the ITU H.261 standard, International Telecommunications Union (ITU)-T recommendation H.261, published March, 1993, the ITU H.263 standard, IUT-T recommendation H.263, published February 1998, and the ITU H.324 standard, IUT-T recommendation H.324, published March, 1996. This invention can, therefore, be applied to macroblocks having chroma formats other than 4:2:0, 4:2:2, and 4:4:4. Similarly, these formats can be used in both hardware and software based reduction. Moreover, although this invention is illustrated with a YUV color space, this is equally applicable to other color spaces, including the RGB color space.

According to one embodiment, the present invention may be implemented in software or firmware, as well as in programmable gate array devices, Application Specific Integrated Circuit (ASIC) and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of reducing a block of a video frame from a digital video data stream, the block having a plurality of pixels, the pixels being digitally represented by bytes, comprising:

reading the block;

performing power of two reduction on the block to create a first level reduced image;

storing the first level reduced image; and performing fine scale reduction on the first level reduced image to create a second level reduced image, wherein said fine scale reduction is performed subsequent to said power of two reduction.

2. The method according to claim 1, wherein fine scale reduction is accomplished using a sinc function.

3. The method according to claim 1, wherein fine scale reduction is accomplished using bilinear interpolation.

4. The method according to claim 1, wherein said performing power of two reduction includes performing power of two reduction in the vertical direction; and performing power of two reduction in the horizontal direction.

5. The method according to claim 4, wherein performing power of two reduction in the vertical direction includes determining whether power of two reduction in the vertical direction should be performed, said determining based upon a vertical reduction scale;

reading a horizontal line of pixel data from the block;

adding the value of each pixel in the horizontal line to a corresponding accumulated vertical total for each pixel in the horizontal line;

deciding whether another horizontal line should be read and added to the accumulated vertical totals, said deciding based upon the vertical reduction scale; and dividing all accumulated vertical totals by the number of horizontal lines read.

6. The method according to claim 5, wherein said performing power of two reduction in the horizontal direction includes designating whether power of two reduction in the horizontal direction should be performed, said designating based upon a horizontal reduction scale;

reading the vertical line of the result of said dividing;

calculating the power of two pixel sample size;

adding the the value of each pixel in the vertical line to a corresponding accumulated horizontal total for each pixel in the vertical line;

discerning whether another vertical line should be read and added to the accumulated horizontal totals, said discerning based upon the horizontal reduction scale; and dividing all accumulated horizontal totals by the number of vertical lines read.

7. The method according to claim 1, wherein said performing fine scale reduction comprises dropping intermediate lines.

8. The method according to claim 1, wherein said performing fine scale reduction comprises an nth order filter, where n is greater than one.

9. An apparatus for reducing video image data, comprising:

an input for reading a block of a video frame from a digital video data stream;

a first memory coupled to said input, said first memory adapted to store the block of video;

a first reducer coupled to the first memory, said first reduced adapted to reduce the block of video via power of two reduction into a first reduced image;

a storer coupled to said first reducer, said storer adapted to store the first reduced image data in a second memory; and a second reducer coupled to the second memory, said second reducer adapted to first receive said first reduced image and then to decrease said first reduced image via a fine scale reduction into a second reduced image.

10. The apparatus according to claim 9, further comprising a display device coupled to said second reducer, said display device adapted to cause the second reduced image data from said second reducer to be displayed.

11. The apparatus according to claim 9, wherein said second reducer comprises a fractional reducer.

12. The apparatus according to claim 9, wherein:

said first reducer comprises a power of two reducer; and said second reducer comprises a fractional reducer.

13. The apparatus according to claim 9, wherein said second reducer comprises bilinear interpolation.

14. The apparatus according to claim 9, wherein said second reducer comprises dropping intermediate lines.

15. The apparatus according to claim 9, wherein said second reducer comprises an nth order filter, where n is greater than one.

16. An article of manufacture encompassing a machine readable medium having program code embodied therein for causing fill image video data to be reduced, said program code in said article of manufacture comprising:

a first module coupled to the full image video data, said first module adapted to enable a computer to reduce the full image video data into a first reduced image by performing power of two reduction;

a second module coupled to said first module, said second module adapted to store the first reduced image; and a third module coupled to said second module, said third module adapted to enable the computer to first receive said first reduced image and then to reduce said first reduced image into a second reduced image by performing fine scale reduction.

17. The article of manufacture according to claim 16, wherein the fine scale reduction comprises using a sinc function.

18. The article of manufacture according to claim 16, wherein the fine scale reduction comprises dropping intermediate lines.

19. The article of manufacture according to claim 16, wherein the fine scale reduction comprises an nth order filter, where n is greater than one.

20. The article of manufacture according to claim 16, wherein the fine scale reduction comprises bilinear interpolation.

21. A computer system for reducing video image data, comprising:

an input device for reading video image data;

a first memory coupled to said input device, said first memory adapted to store image data read by said input device;

a first reducer coupled to said first memory, said first reducer adapted to reduce the image data in said first memory via power of two reduction into a first reduced image;

a storer coupled to said first reducer, said storer adapted to store the first reduced image data in a second memory; and a second reducer coupled to the second memory, said second reducer adapted to first receive said first reduced image and then to decrease said first reduced image via fine scale reduction into a second reduced image.

22. A computer system according to claim 21, wherein said second reducer decreases the first reduced image adapted to use a sinc function.

23. A computer system according to claim 21, wherein said second reducer adapted to decrease the first reduced image using bilinear interpolation.

24. A computer system according to claim 21, wherein said second reducer adapted to decrease the first reduced image by dropping intermediate lines.

25. A computer system according to claim 21, wherein said second reducer adapted to decrease the first reduced image data by applying an nth order filter, where n is greater than one.

26. A program storage device readable by a machine, tangibly embodying a program of instructions executable by the machine to reduce full image video data stored in a computer memory in digital form, said method comprising:

reading the full image video data from a first memory;

performing power of two reduction on the full image video data to create a first level reduced image;

storing the first level reduced image in a second memory; and performing fine scale reduction on the first level reduced image to create a second level reduced image, wherein said fine scale reduction is performed subsequent to said power of two reduction.

27. A program storage device of claim 26, wherein said method further comprises using a sinc function during said performing fine scale reduction.

28. A program storage device of claim 26, wherein said method further comprises using bilinear interpolation during said performing fine scale reduction.

29. A program storage device of claim 26, wherein said method further comprises dropping intermediate lines during said performing fine scale reduction.

30. A program storage device of claim 26, wherein said method further comprises using an nth order filter, where n is greater than one during said fine scale reduction.

* * * * *

UNITED STATES PATENT AND TRADEMARK OFFICE
CERTIFICATE OF CORRECTION

PATENT NO. : 6,553,153 B1
DATED : April 22, 2003
INVENTOR(S) : Ying Cui

It is certified that error appears in the above-identified patent and that said Letters Patent is hereby corrected as shown below:

Title page,
Item [73], Assignee, replace "Chips and Technologies, L.L.C., San Jose, CA (US)" with -- Intel Corporation, , Santa Clara, CA (US) --.

Signed and Sealed this

Twentieth Day of July, 2004

JON W. DUDAS
*Acting Director of the United States Patent and Trademark Office*